(12) United States Patent
Soejima et al.

(10) Patent No.: US 8,090,519 B2
(45) Date of Patent: Jan. 3, 2012

(54) CONTROL DEVICE FOR INTERNAL COMBUSTION ENGINE

(75) Inventors: Shinichi Soejima, Gotenba (JP); Naoto Kato, Susono (JP); Keisuke Kawai, Odawara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 180 days.

(21) Appl. No.: 12/673,954

(22) PCT Filed: Oct. 31, 2008

(86) PCT No.: PCT/JP2008/069940
§ 371 (c)(1),
(2), (4) Date: Feb. 17, 2010

(87) PCT Pub. No.: WO2010/050061
PCT Pub. Date: May 6, 2010

(65) Prior Publication Data
US 2011/0022288 A1    Jan. 27, 2011

(51) Int. Cl.
*G06F 19/00* (2006.01)
*F02P 5/15* (2006.01)
*F02D 41/10* (2006.01)

(52) U.S. Cl. .......... 701/103; 701/110; 123/406.23; 123/406.46

(58) Field of Classification Search ........... 123/406.23, 123/406.45, 406.46, 406.5, 361, 399, 403; 701/101–103, 110, 111, 115; 702/192, 183
See application file for complete search history.

(56) References Cited

U.S. PATENT DOCUMENTS

| | | | | |
|---|---|---|---|---|
| 4,915,076 A * | 4/1990 | Takizawa | ............... | 123/406.19 |
| 5,588,409 A * | 12/1996 | Mizuno et al. | ............ | 123/339.11 |
| 6,644,275 B2 * | 11/2003 | Kondo | ............... | 123/406.45 |
| 6,708,668 B2 * | 3/2004 | Yoshida et al. | ............... | 123/295 |
| 7,017,548 B2 * | 3/2006 | Sawada et al. | ............ | 123/339.11 |
| 7,347,805 B2 * | 3/2008 | Iriyama et al. | ............... | 477/102 |
| 7,596,446 B1 * | 9/2009 | Sakayanagi et al. | ......... | 701/105 |
| 7,869,912 B2 * | 1/2011 | Kishimoto | ............... | 701/22 |

FOREIGN PATENT DOCUMENTS

| JP | A-2005-113877 | 4/2005 |
|---|---|---|
| JP | A-2006-029084 | 2/2006 |

(Continued)

OTHER PUBLICATIONS

International Search Report issued in Application No. PCT/JP2008/069940 on Dec. 22, 2008.

(Continued)

*Primary Examiner* — Willis Wolfe, Jr.
(74) *Attorney, Agent, or Firm* — Oliff & Berridge, PLC (57) ABSTRACT

A control device that is used with an internal combustion engine to improve both the response and controllability of torque generated by the internal combustion engine. The control device calculates an operation amount of an intake actuator in accordance with a demanded air amount. The control device then calculates a torque that is generated when the intake actuator is operated by the calculated operation amount at a predetermined ignition timing setting, and calculates an ignition timing retard amount that is necessary to achieve a demanded torque in accordance with the difference between the calculated torque and the demanded torque. The control device ensures that the demanded torque and a demanded efficiency are both reflected in the demanded air amount.

10 Claims, 3 Drawing Sheets

FOREIGN PATENT DOCUMENTS

| | | |
|---|---|---|
| JP | A-2007-132203 | 5/2007 |
| JP | A-2007-247606 | 9/2007 |
| JP | A-2007-292031 | 11/2007 |
| JP | A-2008-115829 | 5/2008 |
| JP | A-2008-128082 | 6/2008 |
| JP | 2008157190 A * | 7/2008 ............ 701/103 |
| JP | 2008248836 A * | 10/2008 ............ 701/103 |

OTHER PUBLICATIONS

International Preliminary Report on Patentability issued in International Patent Application No. PCT/JP2008/069940 dated Jun. 7, 2011.

* cited by examiner

CONTROL DEVICE FOR INTERNAL COMBUSTION ENGINE

TECHNICAL FIELD

The present invention relates to a control device for an internal combustion engine, and more particularly to a control device that is used with an internal combustion engine and capable of exercising torque control by operating an intake actuator for adjusting an intake air amount and by making ignition timing adjustments.

BACKGROUND ART

A technology disclosed in JP-A-2007-132203 effectively improves the responsiveness of torque generated by an internal combustion engine. When the amount of torque control for generating a target torque is to be calculated, the disclosed technology compensates the difference between an estimated torque, which is estimated from a target torque control amount, and a target torque for a control response lag. Next, the obtained difference, which is now compensated for the control response lag, is added to the target torque. A torque control amount is then calculated from the resulting target torque. This conventional technology makes it possible to calculate a control amount by accurately compensating it for a control response lag. Therefore, when various devices of the internal combustion engine are controlled in accordance with the calculated control amount, the responsiveness of torque generated by the internal combustion engine can be improved.

However, the above conventional technology has room for improvement in torque controllability. The conventional technology compensates for the response lag of the estimated torque relative to the target torque by increasing the torque control amount. However, the amount of such a torque control amount increase is determined in accordance with the result of adaptation to a real machine. Therefore, if the degree of adaptation is insufficient or the performance of the real machine greatly varies, a torque overshoot may occur due to an excessive increase in the torque control amount. If the responsiveness of torque is insufficient, the driver of a vehicle cannot achieve a desired vehicle behavior. Similarly, if torque controllability is insufficient, the driver cannot achieve a desired vehicle behavior either.

DISCLOSURE OF INVENTION

The present invention has been made in view of the above circumstances. An object of the present invention is to provide a control device that is used with an internal combustion engine and capable of improving the responsiveness and controllability of torque generated by the internal combustion engine.

According to a first aspect of the present invention, there is provided a control device that is used with an internal combustion engine and capable of exercising torque control by operating an intake actuator for adjusting an intake air amount and by making ignition timing adjustments. The control device includes means for setting a demanded torque for the internal combustion engine and means for setting a demanded efficiency. In the present patent application, the efficiency is related to the rate of conversion of energy retained by an in-cylinder air-fuel mixture to torque, and expressed by a dimensionless value referenced to the conversion rate at a predetermined ignition timing setting. The control device also includes means for calculating a demanded air amount from the demanded torque and demanded efficiency and means for calculating the operation amount of an intake actuator from the demanded air amount. The intake actuator includes, for instance, not only a throttle but also an intake valve whose lift amount or operating angle is variable. Further, the control device includes means for calculating an ignition timing retard amount that is necessary to achieve the demanded torque. At the predetermined ignition timing setting, the means for calculating an ignition timing retard amount calculates a torque generated when the intake actuator is operated in accordance with the operation amount calculated from the demanded air amount, and then calculates the ignition timing retard amount from the difference between the calculated torque and demanded torque.

As the control device includes the above-described various means, the intake actuator operates so as to achieve the demanded air amount which is determined from the demanded torque and demanded efficiency. If, in this instance, the demanded efficiency is set to a value smaller than 1, the demanded air amount is increased by the demanded efficiency. The intake actuator is then considerably operated in the direction of increasing the intake air amount. As the operation amount of the intake actuator is increased, the achievable torque increases. However, as the ignition timing is retarded in accordance with the difference between the achievable torque and demanded torque, such a torque difference is compensated for by the torque adjustment based on ignition retardation. As a result, the demanded torque is achieved in the internal combustion engine.

According to the first aspect of the present invention, the control device also includes means for correcting the demanded efficiency. More specifically, when the means for setting a demanded torque causes a rapid increase in a demanded torque setting, the means for correcting the demanded efficiency causes a temporary decrease in a demanded efficiency setting in accordance with the rapid increase in the demanded torque setting. The rapid increase in the demanded torque setting indicates that the demanded torque setting is increased by an amount larger than the amount of torque increase achievable by operating the intake actuator alone or at a rate higher than the rate of torque increase achievable by operating the intake actuator alone. The rapid increase in the demanded torque setting also occurs when the demanded torque setting increases stepwise by an amount larger than predefined. It is preferred that a rapid increase in the demanded torque setting and a temporary decrease in the demanded efficiency setting occur at the same time. However, a slight timing difference between the rapid increase in the demanded torque setting and the temporary decrease in the demanded efficiency setting is allowable as far as the later-described responsiveness of the intake air amount remains unaffected. Therefore, the demanded efficiency setting may be temporarily decreased when the demanded torque setting begins to rapidly increase or when a rapid increase in the demanded torque setting is completed.

As the control device includes the above-described means for correcting the demanded efficiency, a demanded air amount increase caused by a rapid increase in the demanded torque is superimposed over a demanded air amount increase caused by a temporary decrease in the demanded efficiency when the demanded torque increases rapidly. Consequently, a temporary rapid increase occurs in the demanded air amount. As the operation amount of the intake actuator is calculated from the demanded air amount that has experienced a temporary rapid increase, the intake actuator operates in an overshoot manner. When the intake actuator operates in an overshoot manner, the responsiveness of the amount of air taken into a cylinder improves, thereby improving the responsiveness of achieved torque to the demanded torque. At the same time, the ignition timing is retarded so as to suppress a torque overshoot that occurs due to a rapid increase in the intake air amount. This prevents the achieved torque from overshooting the demanded torque. In other words, the first aspect of the present invention not only improves the torque response of the internal combustion engine, but also provides adequate torque controllability.

The degree and the time of a temporary decrease in the demanded efficiency setting in accordance with the time at which the demanded torque setting rapidly increases may be fixed without regard to the degree of the rapid increase in the demanded torque setting. However, it is more preferred that the degree of a temporary decrease in the demanded efficiency setting be determined in accordance with the degree of a rapid increase in the demanded torque setting. Similarly, it is more preferred that the time of a temporary decrease in the demanded efficiency setting be determined in accordance with the degree of a rapid increase in the demanded torque setting.

When the degree of a temporary decrease in the demanded efficiency setting is increased in accordance with the degree of a rapid increase in the demanded torque setting or when the time of a temporary decrease in the demanded efficiency setting is increased in accordance with the degree of a rapid increase in the demanded torque setting, the degree of a temporary rapid increase in the demanded air amount increases due to a synergistic effect. It means that an increase in the degree of a rapid increase in the demanded torque setting will increase the scale of an overshoot manner operation of the intake actuator and improve the responsiveness of the amount of air taken into a cylinder. Therefore, a high torque-responsiveness can be obtained relative to a demand for rapid torque increase. On the other hand, when the degree of a rapid increase in the demanded torque setting is small, that is, when the scale of an overshoot manner operation of the intake actuator is small, the degree and the time of a temporary decrease in the demanded efficiency setting are decreased. This makes it possible to suppress the retard of ignition timing, which is unfavorable to fuel economy. Consequently, when the degree and the time of a temporary decrease in the demanded efficiency setting are determined in accordance with the degree of a rapid increase in the demanded torque setting, adequate torque response and fuel economy can be both maintained.

According to a second aspect of the present invention, there is provided a control device that is used with an internal combustion engine and capable of exercising torque control by operating an intake actuator for adjusting an intake air amount and by making ignition timing adjustments. The control device includes means for acquiring a demanded torque and a demanded efficiency and calculating a demanded air amount from the acquired demanded torque and demanded efficiency and means for calculating an operation amount of the intake actuator in accordance with the demanded air amount. The second aspect of the present invention does not limit a method for setting the demanded torque or demanded efficiency. The demanded torque may be set within the control device or the demanded torque that is set outside the control device may be received. Similarly, the demanded efficiency may be set within the control device or the demanded efficiency that is set outside the control device may be received. The control device also includes means for calculating an ignition timing retard amount that is necessary to achieve the demanded torque. The means for calculating an ignition timing retard amount calculates a torque that is generated at a predetermined ignition timing setting when the intake actuator is operated by an operation amount calculated from the demanded air amount, and then calculates the aforementioned ignition timing retard amount in accordance with the difference between the calculated torque and the demanded torque.

As the control device includes the above-described various means, the intake actuator operates so as to achieve the demanded air amount, which is determined from the demanded torque and demanded efficiency. If, in this instance, the acquired demanded efficiency is a value smaller than 1, the demanded air amount is increased by the demanded efficiency. The intake actuator is then considerably operated in the direction in which the intake air amount is increased. As the operation amount of the intake actuator is increased, the achievable torque increases. However, as the ignition timing is retarded in accordance with the difference between the achievable torque and demanded torque, such a torque difference is compensated for by the torque adjustment based on ignition retardation. As a result, the demanded torque is achieved in the internal combustion engine.

According to the second aspect of the present invention, the control device further includes means for detecting a demand for rapid torque increase and means for correcting the demanded efficiency. More specifically, the means for correcting the demanded efficiency temporarily decreases a demanded efficiency value used for the calculation of a demanded air amount when a demand for rapid torque increase is detected. The demand for rapid torque increase is a demand for torque increase at a rate higher than achievable by operating the intake actuator alone. The demand for rapid torque increase can be detected from the amount or the rate of demanded torque change. For example, the demand for rapid torque increase can be detected by judging that there is a demand for rapid torque increase when a threshold value is exceeded by the amount or the rate of demanded torque change. Further, if the demand for rapid torque increase is signaled from a demanded torque transmission source together with the demanded torque, the demand for rapid torque increase can be detected by receiving such a signal.

As the control device includes the above-described various means, a demanded air amount increase caused by a rapid increase in the demanded torque is superimposed over a demanded air amount increase caused by a temporary decrease in the demanded efficiency when a demand for rapid torque increase is detected. Consequently, a temporary rapid increase occurs in the demanded air amount. As the operation amount of the intake actuator is calculated from the demanded air amount that has experienced a temporary rapid increase, the intake actuator operates in an overshoot manner. When the intake actuator operates in an overshoot manner, the responsiveness of the amount of air taken into a cylinder improves, thereby improving the responsiveness of achieved torque to the demanded torque. At the same time, the ignition timing is retarded so as to suppress a torque overshoot that occurs due to a rapid increase in the intake air amount. This prevents the achieved torque from overshooting the demanded torque. In other words, the second aspect of the present invention not only improves the torque responsiveness of the internal combustion engine, but also provides adequate torque controllability.

The degree and the time of a temporary decrease in the demanded efficiency value used for calculating the demanded air amount upon detection of a demand for rapid torque increase may be fixed without regard to the magnitude of the demand for rapid torque increase. However, it is more preferred that the degree of a temporary decrease in the demanded efficiency value be determined in accordance with the magnitude of the demand for rapid torque increase. Similarly, it is more preferred that the time of a temporary decrease in the demanded efficiency value be determined in accordance with the magnitude of the demand for rapid torque increase.

When the degree of a temporary decrease in the demanded efficiency value is increased in accordance with the magnitude of the demand for rapid torque increase or when the time of a temporary decrease in the demanded efficiency value is increased in accordance with the magnitude of the demand for rapid torque increase, the degree of a temporary rapid increase in the demanded air amount increases due to the synergistic effect of a rapid increase in the demanded torque and a decrease in the demanded efficiency. It means that an increase in the magnitude of the demand for rapid torque increase will enlarge the scale of an overshoot manner operation of the intake actuator and improve the responsiveness of the amount of air taken into a cylinder. Therefore, a high torque-responsiveness can be obtained relative to a demand for rapid torque increase. On the other hand, when the magnitude of the demand for rapid torque increase is small, that is, when the scale of an overshoot manner operation of the intake actuator is small, the degree and the time of a temporary decrease in the demanded efficiency value are decreased. This makes it possible to suppress the retard of ignition timing, which is unfavorable to fuel economy. Consequently, when the degree and the time of a temporary decrease in the demanded efficiency value are determined in accordance with the magnitude of the demand for rapid torque increase, adequate torque response and fuel economy can be both maintained.

DESCRIPTION OF REFERENCE NUMERALS

2 . . . Demanded torque setup section
4 . . . Demanded efficiency setup section
6 . . . TA demanded torque calculation section
8 . . . Demanded air amount calculation section
10 . . . Throttle opening calculation section
12 . . . Throttle
14 . . . Estimated torque calculation section
16 . . . Torque efficiency calculation section
18 . . . Ignition timing calculation section
20 . . . Ignition device
22 . . . Rapid torque increase demand detection section
24 . . . Demanded efficiency correction section

BEST MODE FOR CARRYING OUT THE INVENTION

First Embodiment

A first embodiment of the present invention will now be described with reference to FIGS. 1 and 2.

Figure 1:
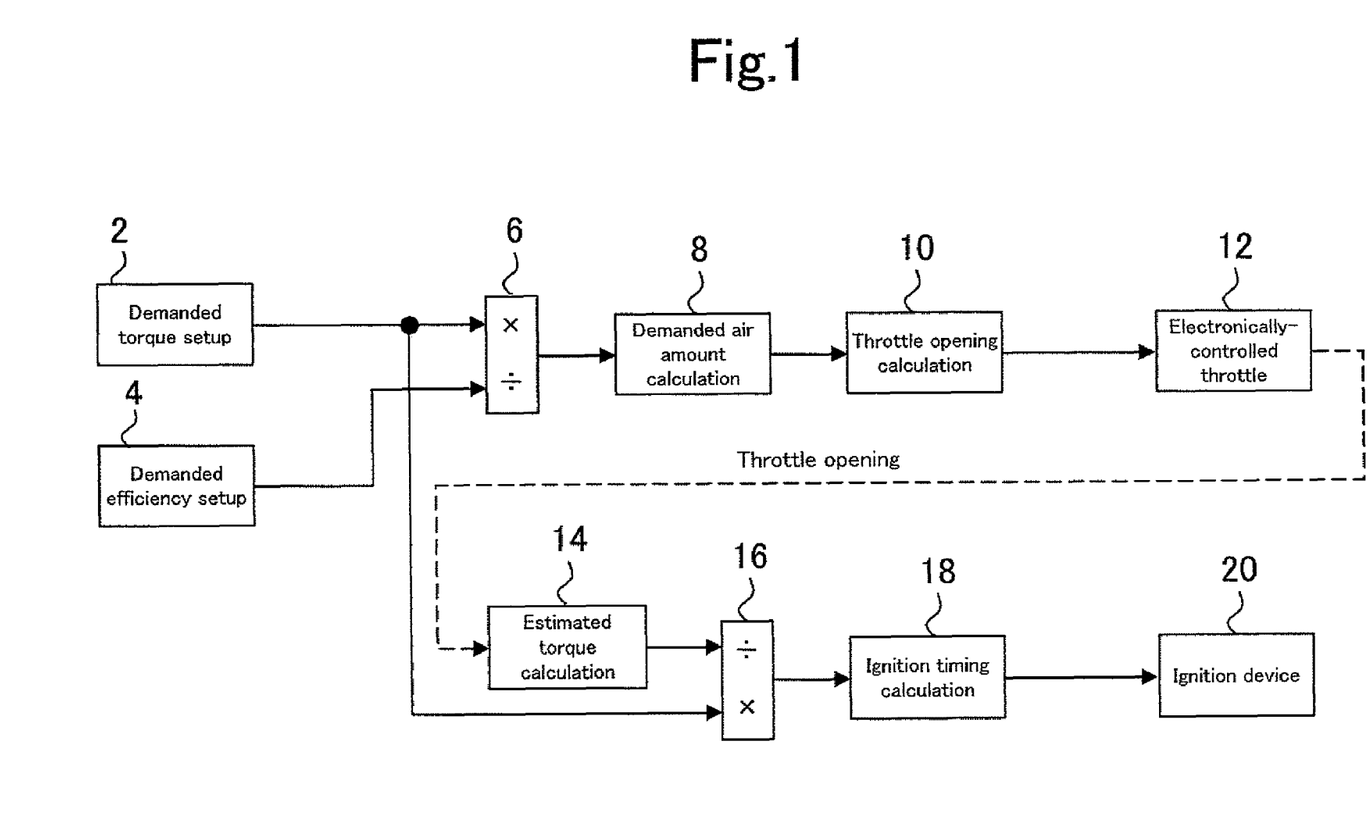
FIG. 1 is a block diagram illustrating the configuration of an internal combustion engine control device according to a first embodiment of the present invention.

FIG. 1 is a block diagram illustrating the configuration of an internal combustion engine control device according to the first embodiment of the present invention. The control device according to the present embodiment is a control device for use with a spark-ignition internal combustion engine. The control device according to the present embodiment controls the torque of an internal combustion engine by operating an ignition device 20 and an electronically-controlled throttle (hereinafter simply referred to as the throttle) 12, which serves as an intake actuator.

The control device according to the present embodiment includes a demanded torque setup section 2, which sets a demanded torque value for the internal combustion engine. The demanded torque setup section 2 sets a demanded torque in consideration of not only a torque demand from a driver, which is calculated from the operation amount of an accelerator, but also vehicle control torque demands from such as an ECT (Electronically Controlled Transmission) and a VSC (Vehicle Stability Control) system.

The control device according to the present embodiment also includes a demanded efficiency setup section 4, which sets the value of a demanded efficiency for the internal combustion engine. The efficiency is related to the rate of conversion of energy retained by an in-cylinder air-fuel mixture to torque, and expressed by a dimensionless value referenced to the conversion rate at a predetermined ignition timing setting (the MET in the present embodiment). When, for instance, thermal energy is to be used to raise the temperature of exhaust gas for catalyst warm-up purposes, the demanded efficiency value is set to be smaller than a standard value of 1. Further, when the torque is to be increased by advancing the ignition timing, the demanded efficiency value is also set to be smaller than a standard value of 1 for the purpose of acquiring a reserve torque in advance. An important feature of the control device according to the present embodiment is a function of the demanded efficiency setup section 4. The function of the demanded efficiency setup section 4 will be described in detail later.

The demanded torque and demanded efficiency are used to calculate a demanded air amount. As means for calculating the demanded air amount, the control device according to the present embodiment includes a TA demanded torque calculation section 6 and a demanded air amount calculation section 8. The TA demanded torque calculation section 6 calculates the demanded torque for throttle operation (hereinafter referred to as the TA demanded torque). The demanded air amount calculation section 8 calculates the demanded air amount from the TA demanded torque.

The demanded torque and demanded efficiency enter the TA demanded torque calculation section 6. The TA demanded torque calculation section 6 calculates the TA demanded torque by dividing the demanded torque by the demanded efficiency. When, in this instance, the demanded efficiency is equal to a standard value of 1, the TA demanded torque remains the same as the demanded torque. However, when the demanded efficiency is smaller than 1, the TA demanded torque becomes higher than the demanded torque. In other words, when there is a demand for ignition retardation, the TA demanded torque calculation section 6 divides the demanded torque by the demanded efficiency to increase the demanded torque for throttle operation by an amount equivalent to a torque decrease due to ignition retardation.

The demanded air amount calculation section 8 converts the TA demanded torque to an air amount (KL) through the use of a KL map. The air amount is the amount of air taken into a cylinder per cycle. It may be substituted by a charging efficiency which is a dimensionless equivalent of the amount of air taken into a cylinder per cycle. The KL map is a multidimensional map whose axes represent a plurality of parameters such as torque. For this map, various operating conditions affecting the relationship between the torque and air amount, such as ignition timing, engine speed, air-fuel ratio (A/F ratio), and valve timing, can be set as parameters. Values derived from current operating status information are entered as these parameters. However, the ignition timing is set to the MBT. The demanded air amount calculation section 8 calculates the air amount converted from the demanded torque as the demanded air amount.

The control device according to the present embodiment includes a throttle opening calculation section 10 which calculates a throttle opening from the demanded air amount. The throttle opening calculation section 10 includes an air inverse model. An air intake system physical model that is obtained from the response of an in-cylinder intake air amount to an operation of the throttle 12 on the basis of hydrodynamics is referred to as an air model. The air inverse model is an inverse of the air model. When the demanded air amount is entered into the air inverse model, a demanded intake pipe pressure for achieving the demanded air amount is calculated. Subsequently, a demanded throttle passage air amount for achieving the demanded intake pipe pressure is calculated. Eventually, the throttle opening for achieving the demanded throttle passage air amount is calculated. The speed of response of an actual in-cylinder intake air amount to the demanded air amount can be adjusted as desired by setting the parameters of the air inverse model in an appropriate manner. In the present embodiment, the parameters of the air inverse model are set so that the actual in-cylinder intake air amount responds to the demanded air amount at the highest speed. The throttle opening calculation section 10 calculates the throttle opening converted from the demanded air amount as an operation amount of the throttle 12, converts the operation amount to a command signal, and outputs the command signal to the throttle 12.

An operation performed by the control device according to the present embodiment to control the ignition device 20 will now be described. As means for calculating the ignition timing, which is an operation amount of the ignition device 20, the control device according to the present embodiment includes an estimated torque calculation section 14, a torque efficiency calculation section 16, and an ignition timing calculation section 18. The estimated torque calculation section 14 calculates an estimated torque in accordance with the throttle opening. The torque efficiency calculation section 16 calculates a torque efficiency from the estimated torque. The ignition timing calculation section 18 calculates the ignition timing in accordance with the torque efficiency. The torque efficiency is defined as the ratio of the demanded torque to the estimated torque of the internal combustion engine. As described later, the estimated torque, which is used to calculate the torque efficiency, is calculated from an actual throttle opening provided by the throttle 12. The actual opening of the throttle 12 can be measured with a throttle opening sensor. Further, it can be calculated from the rotation amount of a motor that drives the throttle 12.

The estimated torque calculation section 14 first calculates an estimated air amount that can be presumably achieved by a current throttle opening. A forward model of the aforementioned air model is used to calculate the estimated air amount. When this air model is used for calculation purposes, an intake pipe air flow rate measured by an air flow sensor is used as correction data. The estimated torque calculation section 14 then converts the estimated air amount to a torque through the use of a torque map. The torque map is obtained by interchanging the input and output of the aforementioned KL map. For the torque map, various operating conditions affecting the relationship between the torque and air amount, such as ignition timing, engine speed, air-fuel ratio (A/F ratio), and valve timing, can be set as parameters. Values derived from current operating status information are entered as these parameters. However, the ignition timing is set to the MBT. The estimated torque calculation section 14 calculates the torque converted from the estimated air amount as the estimated torque at the MBT.

The torque efficiency calculation section 16 receives the demanded torque defined by the demanded torque setup section 2 as an input and receives the estimated torque from the estimated torque calculation section 14 as an input. The torque efficiency calculation section 16 calculates the ratio of the demanded torque to the estimated torque as the torque efficiency.

The ignition timing calculation section 18 converts the torque efficiency to ignition timing through the use of an ignition timing map. The ignition timing map is a multidimensional map whose axes represent a plurality of parameters such as the torque efficiency. For this map, various operating conditions affecting the determination of ignition timing, such as the demanded torque, air-fuel ratio (A/F ratio), and engine speed, can be set as parameters. Values derived from current operating status information are entered as these parameters. The ignition timing map is defined so that the ignition timing is set to the MBT when the torque efficiency is equal to a maximum efficiency value of 1 or retarded from the MBT when the torque efficiency is lower than 1. In a case where the estimated torque differs from the demanded torque when the above setup is performed, the torque difference is compensated for by retarding the ignition timing for torque adjustment purposes. The ignition timing calculation section 18 calculates the ignition timing converted from the torque efficiency as the operation amount of the ignition device 20, converts the operation amount to a command signal, and outputs the command signal to the ignition device 20.

The basic configuration of the control device according to the present embodiment is as described above. The function of the demanded efficiency setup section 4, which is an important feature of the control device according to the present embodiment, will be described below.

Under normal conditions, the demanded efficiency setup section 4 performs demanded efficiency setup independently of demanded torque setup by the demanded torque setup section 2. However, the demanded torque setup performed by the demanded torque setup section 2 may be reflected in the demanded efficiency setup performed by the demanded efficiency setup section 4. Such reflection may occur when the demanded torque setting in the demanded torque setup section 2 rapidly increases by an amount greater than a predetermined increase amount or at a rate higher than a predetermined increase rate. Whether the increase in the demanded torque setting is a "rapid increase" that is reflected in the demanded efficiency setup is determined by judging whether the amount or rate of such an increase is greater than a torque increase amount or torque increase rate achievable by operating the throttle 12 alone. Therefore, when, for instance, the demanded torque setting is increased significantly in a stepwise manner, the demanded torque setup is reflected in the demanded efficiency setup.

At the timing when the demanded torque setting rapidly increases, the demanded efficiency setup section 4 temporarily decreases the demanded efficiency setting to a value lower than the last setting. The present embodiment assumes that the demanded efficiency setting can be temporarily decreased by a fixed amount for a fixed period of time. The fixed amount and fixed period of time can be determined in accordance with the result of adaptation to a real machine. The present embodiment temporarily decreases the demanded efficiency setting at the timing when the demanded torque setting rapidly increases, or more specifically, at the timing when the rapid increase in the demanded torque setting begins. Alternatively, however, the demanded efficiency setting may be temporarily decreased at the timing when the rapid increase in the demanded torque setting is completed.

The above-described function of the demanded efficiency setup section 4 produces effective results in a situation where the torque generated by the internal combustion engine is to be increased in a highly responsive manner. Torque control effects produced by the function of the demanded efficiency setup section 4 will now be described with reference to FIG. 2.

Figure 2:
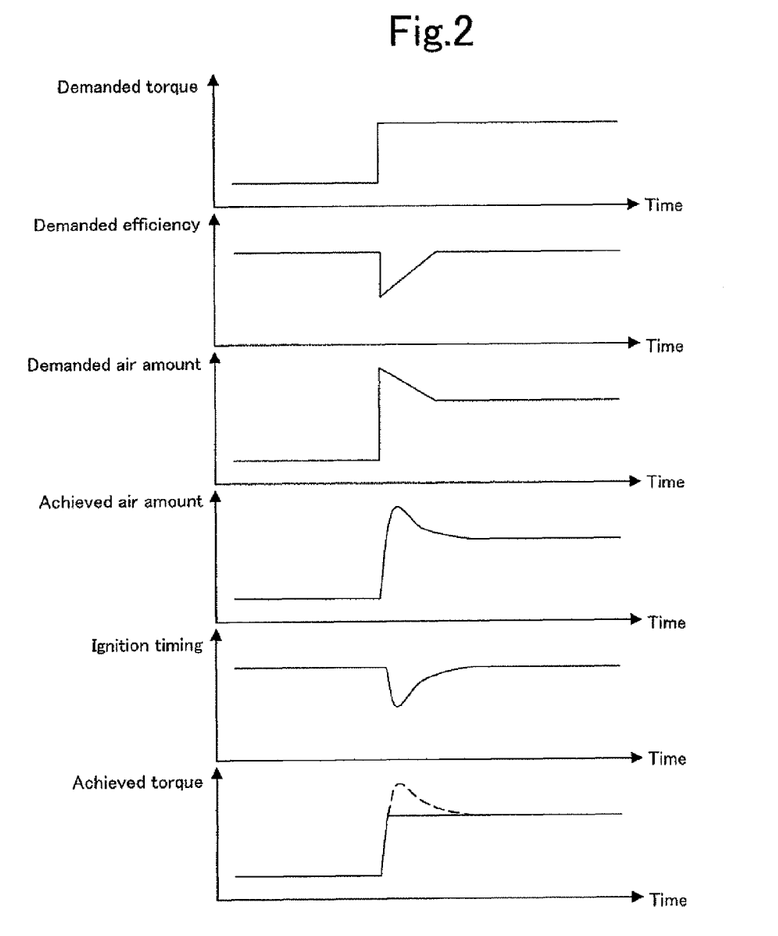
FIG. 2 presents graphs illustrating the method, operation, and effect of setting a demanded efficiency in accordance with the first aspect of the present invention.

FIG. 2 contains graphs illustrating a demanded torque setup example for increasing the torque generated by the internal combustion engine or a demanded efficiency setup example appropriate for the demanded torque setup example. In these graphs, time is plotted along the horizontal axes. FIG. 2 indicates that the demanded torque setting discretely increases, and that the demanded efficiency setting discretely decreases at the timing when the demanded torque setting discretely increases, and further that the demanded efficiency setting increases to the previous value at a constant gradient immediately after its discrete decrease. However, FIG. 2 merely shows an exemplary method of increasing the demanded torque setting and an exemplary method of temporarily decreasing the demanded efficiency setting. Therefore, methods other than indicated in FIG. 2 may alternatively be used. For example, the demanded torque setting may increase at a constant gradient. Further, the demanded efficiency setting may decrease in a rectangular manner with reference to a setting prevailing immediately before an increase in the demanded torque.

The third graph from the top in FIG. 2 shows temporal changes in the demanded air amount which is calculated from the demanded torque and demanded efficiency. The demanded air amount is determined by dividing the demanded torque by the demanded efficiency and converting the obtained value to an air amount. Therefore, the demanded air amount increases with an increase in the demanded torque. Further, the demanded air amount increases with a decrease in the demanded efficiency. Therefore, when the demanded torque and demanded efficiency are set as described above, a demanded air amount increase caused by a rapid increase in the demanded torque is superimposed over a demanded air amount increase caused by a temporary decrease in the demanded efficiency. This causes the demanded air amount to temporarily overshoot a value determined from the rapidly increased demanded torque alone as shown in the graph.

The fourth graph from the top in FIG. 2 shows temporal changes in an actual intake air amount that is achieved when the throttle 12 is operated to provide a throttle opening calculated from the demanded air amount. As the throttle opening is calculated from the demanded air amount that has experienced a temporary overshoot, the throttle 12 operates in an overshoot manner. When the throttle 12 operates in an overshoot manner, the responsiveness of the amount of air taken into a cylinder improves. As a result, the actual intake air amount temporarily overshoots the value determined from the rapidly increased demanded torque alone.

The fifth graph from the top in FIG. 2 shows temporal changes in the ignition timing that is set by the control device according to the present embodiment. The control device according to the present embodiment calculates the ignition timing in accordance with the ratio of the demanded torque to the estimated torque. When the ratio decreases below 1, the amount of ignition timing retard from the MBT increases. Therefore, when the actual intake air amount overshoots as described above, the estimated torque calculated from the actual intake air amount (estimated air amount) overshoots the demanded torque. Consequently, the ignition timing is retarded to compensate for the difference between the estimated torque and demanded torque, which arises from the overshoot.

The lowermost graph in FIG. 2 shows temporal changes in an actual torque that is generated by the internal combustion engine as a result of control described above. In this graph, the estimated torque is indicated by a broken line, whereas the actually achieved torque is indicated by a solid line. When the intake air amount increases in an overshoot manner in accordance with a rapid increase in the demanded torque, the responsiveness of achieved torque to the demanded torque improves. At the same time, the torque is adjusted by retarding the ignition timing so as to compensate for the difference between the demanded torque and the estimated torque calculated from the intake air amount. This prevents the achieved torque from overshooting the demanded torque, thereby ensuring that the demanded torque is achieved.

As described above, when the torque generated by the internal combustion engine is to be rapidly increased, the control device according to the present embodiment can increase the torque at high responsiveness without sacrificing torque controllability.

It should be noted that the first embodiment is an example of a concrete embodiment of the first aspect of the present invention. In the configuration shown in FIG. 1, the demanded torque setup section 2 corresponds to the "means for setting a demanded torque" according to the first aspect of the present invention. The demanded efficiency setup section 4 corresponds to the "means for setting a demanded efficiency" according to the first aspect of the present invention and the "means for correcting the demanded efficiency" according to the first aspect of the present invention. In the first embodiment, these two means are consolidated into the demanded efficiency setup section 4. Alternatively, however, calculation elements corresponding to these two means may be separately provided. The TA demanded torque calculation section 6 and the demanded air amount calculation section 8 constitute the "means for calculating a demanded air amount" according to the first aspect of the present invention. The throttle opening calculation section 10 corresponds to the "means for calculating the operation amount of an intake actuator" according to the first aspect of the present invention. The estimated torque calculation section 14, the torque efficiency calculation section 16, and the ignition timing calculation section 18 constitute the "means for calculating an ignition timing retard amount" according to the first aspect of the present invention.

Second Embodiment

A second embodiment of the present invention will now be described with reference to FIG. 3.

The overall configuration of the control device according to the second embodiment is illustrated in the same block diagram of FIG. 1 as for the first embodiment. The control device according to the second embodiment differs from that according to the first embodiment in the function of the "means for correcting the demanded efficiency," which is included in the demanded efficiency setup section 4.

When the demanded torque setting is rapidly increased, the demanded efficiency setup section 4 according to the second embodiment also temporarily decreases the demanded efficiency setting below the last setting at the timing when the demanded torque setting is rapidly increased. However, the second embodiment differs from the first embodiment in the setup of an amount by which the demanded efficiency setting is temporarily decreased. The second embodiment determines the amount of demanded efficiency decrease in accordance with the rate of demanded torque increase. The rate of demanded torque increase can be calculated as the amount of demanded torque increase per computation cycle. Further, in a case where a rate at which the demanded torque increases is set, it can be used as the rate of demanded torque increase. In any case, the higher the rate of demanded torque increase, the greater the degree of rapid increase in the demanded torque setting.

Figure 3:
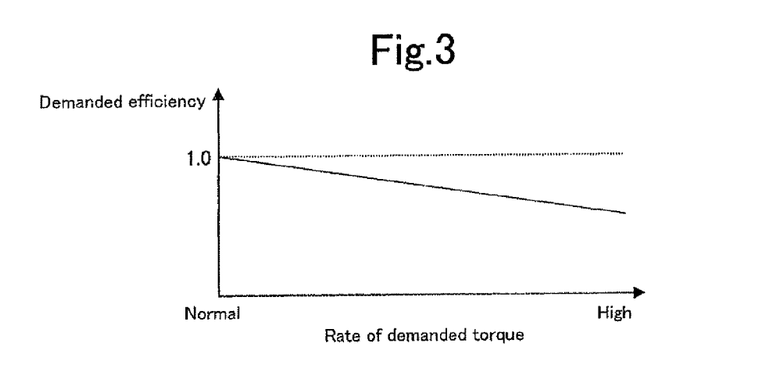
FIG. 3 is a graph illustrating the method of correcting a demanded efficiency in accordance with a second embodiment of the present invention.

FIG. 3 is a graph illustrating an exemplary setup of an amount by which the demanded efficiency is decreased relative to the rate of demanded torque increase. The graph shows the relationship between the rate of demanded torque increase and the amount of demanded efficiency decrease on the assumption that the setting prevailing immediately before the demanded efficiency decrease is equal to a standard value of 1.0. As shown in the graph, the present embodiment is such that the amount of temporary decrease in the demanded efficiency setting increases when the rate of demanded torque increase rises above a normal rate. Here, the "normal" rate of demanded torque increase denotes the rate of torque increase that can be achieved by operating the throttle 12 alone.

When the amount of demanded efficiency decrease is increased in accordance with the rate of demanded torque increase as shown in FIG. 3 to produce a synergistic effect, the degree of demanded air amount overshoot immediately after a rapid increase in the demanded torque increases. It means that when the degree of rapid increase in the demanded torque setting increases, the scale of an overshoot manner operation of the throttle 12 increases to improve the responsiveness of the amount of air taken into a cylinder. Consequently, the control device according to the present embodiment makes it possible to obtain a high torque-responsiveness relative to a demand for rapid torque increase.

The function of the demanded efficiency setup section 4 according to the present embodiment also produces effective results in terms of fuel economy. When viewed from a certain viewpoint, the graph of FIG. 3 would imply that the amount of demanded efficiency decrease becomes smaller when the rate of demanded torque increase becomes closer to the normal rate. From such a viewpoint, the amount of temporary decrease in the demanded efficiency setting decreases when the rate of demanded torque increase is not significantly high, that is, when the scale of an overshoot manner operation of the throttle 12 is relatively small. This makes it possible to suppress the retard of ignition timing, which is unfavorable to fuel economy. In other words, the control device according to the present embodiment can provide improved torque responsiveness while minimizing the influence upon fuel economy.

Third Embodiment

A third embodiment of the present invention will now be described with reference to FIG. 4.

Figure 4:
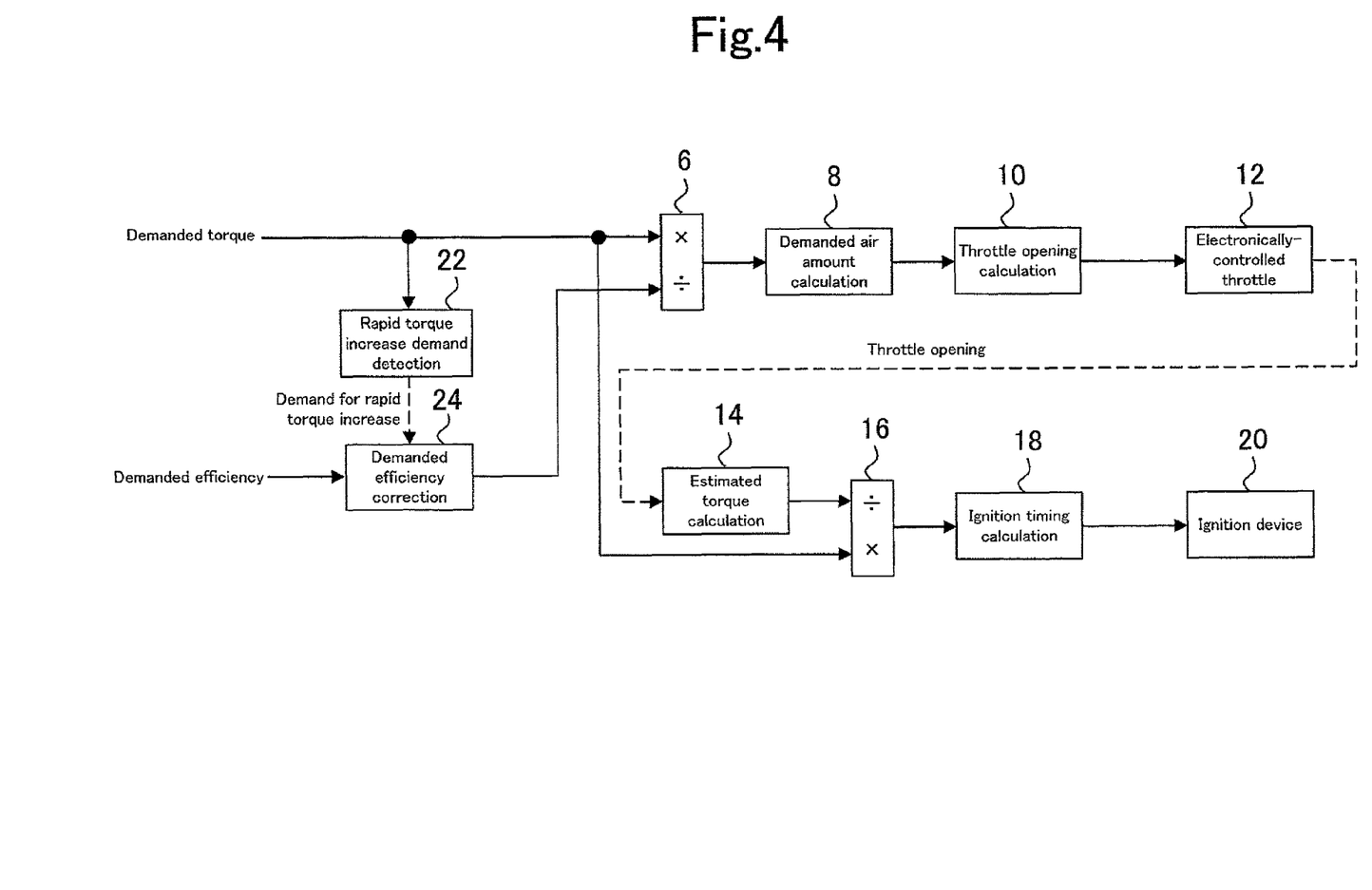
FIG. 4 is a block diagram illustrating the configuration of an internal combustion engine control device according to a third embodiment of the present invention.

FIG. 4 is a block diagram illustrating the configuration of an internal combustion engine control device according to the third embodiment of the present invention. Elements that are shown in FIG. 4 and identical with those of the control device according to the first embodiment shown in FIG. 1 are assigned the same reference numerals as their counterparts. As is obvious from comparison between FIGS. 1 and 4, the control device according to the third embodiment differs from the control device according to the first embodiment in that the demanded torque and demanded efficiency are supplied from the outside of the control device. The third embodiment assumes that the demanded torque and demanded efficiency are supplied from a power train manager (hereinafter referred to as the PTM) (not shown), which provides integrated control over the entire drive system of the vehicle. The control device according to the present embodiment and the PTM may be configured as separate ECUs (Electronic Control Units), configured as separate programs running on separate CPUs within the same ECU, or configured as separate programs running on the same CPU.

It is assumed that the demanded torque and demanded efficiency are independently set in the PTM. More specifically, the process for "causing a temporary decrease in the demanded efficiency setting at the timing when the demanded torque setting rapidly increases" is not performed at a stage where the demanded efficiency is set in the PTM. The present embodiment performs a process corresponding to the above-mentioned process after the demanded torque and demanded efficiency are acquired by the control device.

The PTM is not mentioned when the first embodiment is described. However, the control device according to the first embodiment includes the PTM or some of its functions. In other words, the present embodiment differs from the first embodiment in the scope of functions included in the "control device."

The control device according to the present embodiment includes a rapid torque increase demand detection section 22 which detects a demand for rapid torque increase. The demanded torque that enters the TA demanded torque calculation section 6 simultaneously enters the rapid torque increase demand detection section 22. The rapid torque increase demand detection section 22 measures the rate of demanded torque increase that is indicated by the entered demanded torque. The rate of demanded torque increase can be calculated as the amount of demanded torque increase per computation cycle. The rapid torque increase demand detection section 22 compares the rate of demanded torque increase against a threshold rate. Which the threshold rate is exceeded by the rate of demanded torque increase, the rapid torque increase demand detection section 22 detects a demand for rapid torque increase. The threshold rate corresponds to the rate of torque increase achievable by operating the throttle 12 alone. More specifically, the rapid torque increase demand detection section 22 judges whether the demanded torque can be achieved by operating the throttle 12 alone. When the result of judgment does not indicate that the demanded torque can be achieved by operating the throttle 12 alone, the rapid torque increase demand detection section 22 concludes that there is a demand for rapid torque increase.

The control device according to the present embodiment also includes a demanded efficiency correction section 24 which corrects an acquired demanded efficiency. The result of rapid torque increase demand detection by the rapid torque increase demand detection section 22 is reflected in the demanded efficiency correction section 24. When a demand for rapid torque increase is detected, the demanded efficiency correction section 24 temporarily decreases the demanded efficiency value to be input into the TA demanded torque calculation section 6 below the last input value. In other words, the function of the "means for correcting the demanded efficiency," which is included in the demanded efficiency setup section 4 according to the first embodiment, is included in the demanded efficiency correction section 24 according to the present embodiment. The time and the amount of temporary decrease in the demanded efficiency value may be fixed. However, if fuel economy is also taken into consideration, it is preferred that the amount of demanded efficiency decrease be changed in accordance with the magnitude of the demand for rapid torque increase, as is the case with the second embodiment. The magnitude of the demand for rapid torque increase can be judged in accordance with the rate of demanded torque increase.

As the demanded efficiency input into the TA demanded torque calculation section 6 is corrected as described above, a demanded air amount increase caused by a rapid increase in the demanded torque is superimposed over a demanded air amount increase caused by a temporary decrease in the demanded efficiency when the demand for rapid torque increase is detected. As a result, the demanded air amount temporarily overshoots a value determined from the rapidly increased demanded torque alone.

The throttle opening is then calculated in accordance with the demanded air amount that has experienced a temporary overshoot. This causes the throttle 12 to operate in an overshoot manner and improves the responsiveness of the amount of air taken into a cylinder. As a result, the responsiveness of achieved torque to the demanded torque improves. At the same time, the configuration shown in FIG. 4 automatically retards the ignition timing so as to suppress a torque overshoot that occurs due to a rapid increase in the intake air amount. This prevents the achieved torque from overshooting the demanded torque.

Consequently, when a demand for rapid torque increase is issued to the internal combustion engine, the control device according to the present embodiment can increase the torque at high responsiveness without sacrificing torque controllability.

It should be noted that the third embodiment is an example of a concrete embodiment of the second aspect of the present invention. In the configuration shown in FIG. 4, the TA demanded torque calculation section 6 and the demanded air amount calculation section 8 constitute the "means for calculating the demanded air amount" according to the second aspect of the present invention. The throttle opening calculation section 10 corresponds to the "means for calculating the operation amount of an intake actuator" according to the second aspect of the present invention. The estimated torque calculation section 14, the torque efficiency calculation section 16, and the ignition timing calculation section 18 constitute the "means for calculating an ignition timing retard amount" according to the second aspect of the present invention. The rapid torque increase demand detection section 22 corresponds to the "means for detecting a demand for rapid torque increase" according to the second aspect of the present invention. The demanded efficiency correction section 24 corresponds to the "means for correcting the demanded efficiency" according to the second aspect of the present invention.

Other

It should be understood that the present invention is not limited to the particular embodiments described above. The "means for setting a demanded torque," "means for setting a demanded efficiency," "means for calculating a demanded air amount," "means for calculating the operation amount of an intake actuator," "means for calculating an ignition timing retard amount," and "means for correcting the demanded efficiency" according to the first aspect of the present invention are embodied in the first and second embodiments. However, the configuration disclosed in the first and second embodiments is merely an example of a configuration that can be formed by the above-mentioned means. Further, the "means for calculating a demanded air amount," "means for calculating the operation amount of an intake actuator," "means for calculating an ignition timing retard amount," "rapid torque increase demand acquisition means," and "means for correcting the demanded efficiency" according to the second aspect of the present invention are embodied in the third embodiment. However, the configuration disclosed in the third embodiment is merely an example of a configuration that can be formed by the above-mentioned means. All configurations capable of implementing the functions of the above-mentioned means are included in the scope of the above-mentioned means.

The embodiments described above can be variously modified without departing from the scope of the present invention. For example, although the embodiments described above assume that a throttle is used as the intake actuator, an intake valve with an adjustment mechanism capable of continuously varying its lift amount or operating angle may alternatively be used as the intake actuator. In such an alternative case, the lift amount or operating angle serves as the operation amount of the intake actuator.

The second embodiment changes the amount of temporary decrease in the demanded efficiency setting in accordance with the rate of demanded torque increase. Alternatively, however, the rate of temporary decrease in the demanded efficiency setting may be changed. In other words, the degree of temporary decrease in the demanded efficiency setting includes not only the amount of decrease but also the rate of decrease. Another alternative is to change the time of temporary decrease in the demanded efficiency setting. Here, referring to the demanded efficiency setup example of FIG. 2, the time of temporary decrease may be the length of time necessary for the demanded efficiency setting to increase to the previous value or the length of time necessary for the demanded efficiency setting to start increasing after its discrete decrease (the duration of a low-level period). The above-described modification concerning the correction of demanded efficiency can also be applied to the third embodiment.

The third embodiment acquires the demanded torque and demanded efficiency from the outside. However, an alternative is to set only the demanded torque, only the demanded efficiency, or both the demanded torque and demanded efficiency in the control device. All of these modifications are included in the second aspect of the present invention.

Further, the third embodiment detects a demand for rapid torque increase from the rate of demanded torque increase. However, an alternative is to transmit a demand for rapid torque increase from a demanded torque transmission source (the PTM in the third embodiment) and let the control device receive the transmitted demand. This modification is also included in the second aspect of the present invention.

All the embodiments described above calculate the throttle opening from the demanded air amount by using the air inverse model, which is a physical model. However, the throttle opening can also be calculated without using the air inverse model. For example, the relationship between the demanded air amount and throttle opening can be approximated with a simple function or map. However, the use of the air inverse model makes it possible to set its parameters as appropriate to operate the throttle 12 so that the actual amount of air taken into a cylinder responds to the demanded air amount at the highest speed. From the viewpoint of torque responsiveness, therefore, it is preferred that the throttle opening (intake actuator operation amount) be calculated by using the air inverse model, as is the case with the embodiments described above.

The invention claimed is:

1. A control device that is used with an internal combustion engine and capable of exercising torque control by operating an intake actuator for adjusting an intake air amount and by making ignition timing adjustments, the control device comprising:

a demanded torque setup unit which sets a demanded torque;

a demanded efficiency setup unit which sets a demanded efficiency;

a demanded air amount calculation unit which calculates a demanded air amount from the demanded torque and the demanded efficiency;

an intake actuator operation amount calculation unit which calculates an operation amount of the intake actuator in accordance with the demanded air amount;

an ignition timing retard amount calculation unit which calculates a torque that is generated when the intake actuator is operated by the operation amount at a predetermined ignition timing setting, and calculates an ignition timing retard amount that is necessary to achieve the demanded torque in accordance with the difference between the calculated torque and the demanded torque; and a demanded efficiency correction unit which, when a setting of the demanded torque that is generated by the demanded torque setup unit rapidly increases by an amount greater than a predetermined increase amount or at a rate higher than a predetermined increase rate, temporarily decreases a setting of the demanded efficiency in accordance with the rapid increase in the setting of the demanded torque.

2. A control device that is used with an internal combustion engine and capable of exercising torque control by operating an intake actuator for adjusting an intake air amount and by making ignition timing adjustments, the control device comprising:

a demanded air amount calculation unit which acquires a demanded torque and a demanded efficiency and calculates a demanded air amount from the demanded torque and the demanded efficiency;

an intake actuator operation amount calculation unit which calculates an operation amount of the intake actuator in accordance with the demanded air amount;

an ignition timing retard amount calculation unit which calculates a torque that is generated when the intake actuator is operated by the operation amount at a predetermined ignition timing setting, and calculates an ignition timing retard amount that is necessary to achieve the demanded torque in accordance with the difference between the calculated torque and the demanded torque;

a rapid torque increase demand acquisition unit which detects a demand for rapid torque increase; and a demanded efficiency correction unit which, when the demand for rapid torque increase is detected, temporarily decreases a value of the demanded efficiency that is used to calculate the demanded air amount.

3. A control device that is used with an internal combustion engine and capable of exercising torque control by operating an intake actuator for adjusting an intake air amount and by making ignition timing adjustments, the control device comprising:

demanded torque setup means which sets a demanded torque;

demanded efficiency setup means which sets a demanded efficiency;

demanded air amount calculation means which calculates a demanded air amount from the demanded torque and the demanded efficiency;

intake actuator operation amount calculation means which calculates an operation amount of the intake actuator in accordance with the demanded air amount;

ignition timing retard amount calculation means which calculates a torque that is generated when the intake actuator is operated by the operation amount at a predetermined ignition timing setting, and calculates an ignition timing retard amount that is necessary to achieve the demanded torque in accordance with the difference between the calculated torque and the demanded torque; and demanded efficiency correction means which, when a setting of the demanded torque that is generated by the demanded torque setup means rapidly increases by an amount greater than a predetermined increase amount or at a rate higher than a predetermined increase rate, temporarily decreases a setting of the demanded efficiency in accordance with the rapid increase in the setting of the demanded torque.

4. The control device according to claim 3, wherein the demanded efficiency correction means determines the degree of a temporary decrease in the setting of the demanded efficiency in accordance with a degree to which the demanded torque setup means rapidly increases the setting of the demanded torque.

5. The control device according to claim 3, wherein the demanded efficiency correction means determines the time of a temporary decrease in the setting of the demanded efficiency in accordance with a degree to which the demanded torque setup means rapidly increases the setting of the demanded torque.

6. A control device that is used with an internal combustion engine and capable of exercising torque control by operating an intake actuator for adjusting an intake air amount and by making ignition timing adjustments, the control device comprising:

demanded air amount calculation means which acquires a demanded torque and a demanded efficiency and calculates a demanded air amount from the demanded torque and the demanded efficiency;

intake actuator operation amount calculation means which calculates an operation amount of the intake actuator in accordance with the demanded air amount;

ignition timing retard amount calculation means which calculates a torque that is generated when the intake actuator is operated by the operation amount at a predetermined ignition timing setting, and calculates an ignition timing retard amount that is necessary to achieve the demanded torque in accordance with the difference between the calculated torque and the demanded torque;

rapid torque increase demand acquisition means which detects a demand for rapid torque increase; and demanded efficiency correction means which, when the demand for rapid torque increase is detected, temporarily decreases a value of the demanded efficiency that is used to calculate the demanded air amount.

7. The control device according to claim 6, wherein the rapid torque increase demand acquisition means detects the demand for rapid torque increase from the amount or the rate of change in the demanded torque.

8. The control device according to claim 6, wherein the demand for rapid torque increase is transmitted from a transmission source of the demanded torque together with the demanded torque.

9. The control device according to claim 6, wherein the demanded efficiency correction means determines the degree of a temporary decrease in the demanded efficiency value used for the calculation of the demanded air amount in accordance with the magnitude of the demand for rapid torque increase.

10. The control device according to claim 6, wherein the demanded efficiency correction means determines the time of a temporary decrease in the demanded efficiency value used for the calculation of the demanded air amount in accordance with the magnitude of the demand for rapid torque increase.

* * * * *